US012322999B2

(12) United States Patent
Cha et al.

(10) Patent No.: US 12,322,999 B2
(45) Date of Patent: Jun. 3, 2025

(54) MOTOR ASSEMBLY

(71) Applicant: LG Electronics Inc., Seoul (KR)

(72) Inventors: Jinwook Cha, Seoul (KR); Chaseung Jun, Seoul (KR); Jaehoon Jeong, Seoul (KR); Charyeom Park, Seoul (KR)

(73) Assignee: LG Electronics Inc., Seoul (KR)

(*) Notice: Subject to any disclaimer, the term of this patent is extended or adjusted under 35 U.S.C. 154(b) by 265 days.

(21) Appl. No.: 17/923,848

(22) PCT Filed: Sep. 16, 2020

(86) PCT No.: PCT/KR2020/012460
§ 371 (c)(1),
(2) Date: Nov. 7, 2022

(87) PCT Pub. No.: WO2021/225228
PCT Pub. Date: Nov. 11, 2021

(65) Prior Publication Data
US 2023/0179031 A1  Jun. 8, 2023

(30) Foreign Application Priority Data
May 8, 2020  (KR) .................. 10-2020-0055244

(51) Int. Cl.
*H02K 1/14*  (2006.01)
*H02K 3/32*  (2006.01)
(Continued)

(52) U.S. Cl.
CPC ............... *H02K 1/14* (2013.01); *H02K 3/325* (2013.01); *H02K 5/161* (2013.01); *H02K 7/003* (2013.01); *H02K 9/06* (2013.01)

(58) Field of Classification Search
CPC .......... H02K 3/522; H02K 3/524; H02K 1/14; H02K 5/161; H02K 7/003; H02K 9/06
See application file for complete search history.

(56) References Cited

U.S. PATENT DOCUMENTS 5,757,108 A    5/1998  Suzuki
9,083,210 B2*  7/2015  Chen ................. H02K 15/022
(Continued)

FOREIGN PATENT DOCUMENTS

GB   2545268      6/2017
JP   2002-199666  7/2002
(Continued)

OTHER PUBLICATIONS

International Search Report and Written Opinion in International Appln. No. PCT/KR2020/012460, mailed on Feb. 3, 2021, 15 pages (with English translation).

(Continued)

*Primary Examiner* — Burton S Mullins
(74) *Attorney, Agent, or Firm* — Fish & Richardson P.C.

(57) ABSTRACT

The present specification discloses a motor assembly. An embodiment of the motor assembly disclosed in the present specification may comprise: a motor housing in which a motor is received; a shaft which forms the rotation axis of the motor; a rotor which is coupled to the shaft; a plurality of cores and coils which are provided along the circumference of the rotor to form a flux path; and insulators which are coupled to the cores to insulate the cores from the coils, wherein each of the insulators may comprise an insulating portion which covers the outer surface of the corresponding core and a fixing portion which protrudes outward from the insulating portion in the radial direction of the rotor, and the fixing portion may be coupled to the inner circumferential surface of the motor housing.

18 Claims, 6 Drawing Sheets

(51) Int. Cl.
*H02K 3/52* (2006.01)
*H02K 5/16* (2006.01)
*H02K 7/00* (2006.01)
*H02K 7/14* (2006.01)
*H02K 9/06* (2006.01)

(56) References Cited

U.S. PATENT DOCUMENTS

| | | | |
|---|---|---|---|
| 10,512,380 B2* | 12/2019 | Park | F04D 25/0606 |
| 2017/0170693 A1* | 6/2017 | Dymond | H02K 3/325 |
| 2017/0170697 A1* | 6/2017 | Locke | H02K 1/143 |
| 2017/0231451 A1* | 8/2017 | Oshikiri | H02K 5/26 15/347 |
| 2017/0256995 A1* | 9/2017 | Lam | H02K 15/022 |
| 2018/0363679 A1* | 12/2018 | Johnson | F04D 29/667 |
| 2018/0366997 A1* | 12/2018 | Le Mentec | F04D 29/403 |
| 2019/0365167 A1* | 12/2019 | Jung | A47L 9/2889 |
| 2023/0163645 A1* | 5/2023 | Cha | H02K 7/003 310/216.091 |

FOREIGN PATENT DOCUMENTS

| | | |
|---|---|---|
| JP | 2008-011675 | 1/2008 |
| JP | 2014-121118 | 6/2014 |
| JP | 2017-147863 | 8/2017 |
| KR | 10-2012-0113102 | 10/2012 |
| KR | 10-2014-0118456 | 10/2014 |
| KR | 10-2015-0140200 | 12/2015 |
| KR | 10-2018-0083416 | 7/2018 |

OTHER PUBLICATIONS

Extended European Search Report in European Appln. No. 20934836.6, mailed on May 14, 2024, 10 pages.

* cited by examiner (a)

(b)

MOTOR ASSEMBLY

CROSS-REFERENCE TO RELATED APPLICATIONS

This application is a National Stage application under 35 U.S.C. § 371 of International Application No. PCT/KR2020/012460, filed on Sep. 16, 2020, which claims the benefit of Korean Application No. 10-2020-0055244, filed on May 8, 2020. The disclosures of the prior applications are incorporated by reference in their entirety.

TECHNICAL FIELD

The present disclosure relates to a motor assembly.

BACKGROUND ART

In general, motors, each of which is an apparatus that generates driving force as the result of interaction between a stator and a rotor, are basically identical in overall structures of the stator and the rotor.

However, motors are classified depending on the principle by which the rotor is rotated by interaction between the stator and the rotor. Motors are classified depending on the kind or phase of power applied to a stator coil. In addition, motors are classified depending on a method of winding the stator coil. For example, there are a variable voltage motor, which is a direct current motor, and a three-phase induction motor, which is an alternating current motor.

When describing a general structure of the motor, a shaft configured to define an axis of rotation, a rotor coupled to the shaft, and a stator core fixed to an inside of the housing are provided, and stators are installed along the circumference of the rotor at predetermined intervals.

The stator core is provided with teeth, and a coil is wound around the teeth to form a rotation field and causes electrical interaction with the rotor to induce rotation of the rotor.

A coil is classified as concentrated winding or distributed winding depending on a winding method. Concentrated winding is a method of concentrically winding the coil around one slot, and distributed winding is a method of winding the coil around two or more slots in a distributed manner.

Concentrated winding is capable of reducing copper loss while reducing the amount of winding, compared to distributed winding; however, a change in magnetic flux density is great since the coil is excessively concentrated around the slot, and core loss or iron loss, i.e. power loss of an iron core is increased. For these reasons, the coil wound using the concentrated winding method is generally used in a small motor.

In recent years, various research on a motor used in various electric home appliances (e.g. a hair dryer and a cleaner) has been conducted in order to secure assembly efficiency and a flow channel area and to solve space constraints due to requirements for miniaturization and performance improvement.

A cited invention (U.S. Ser. No. 16/011,823 published on Dec. 20, 2018) discloses a brushless motor including a C-shaped stator core. The C-shaped stator core forms a protrusion configured to contact a frame in order to inhibit radial movement. The C-shaped stator core has a structure capable of reducing leakage flux and having a short magnetic flux path. In addition, the C-shaped stator core of the cited invention is fixed to a slot formed in a frame, through which a shaft extends.

When the stator core is fixed to the frame, through which the shaft extends, as described above, however, vibration due to rotation of the shaft is transmitted to the frame, whereby coupling force of the stator core may be reduced, and therefore durability of the motor may be lowered.

DISCLOSURE

Technical Task

Accordingly, the present disclosure is to address the above-mentioned problems.

One technical task of the present disclosure is to provide a motor assembly configured to have a structure in which a plurality of stator cores is directly fastened to a side wall of a motor housing.

Another technical task of the present disclosure is to provide a motor assembly configured to have a structure in which a bearing housing is provided at each of a motor housing configured to receive a core assembly and a housing cover to support a shaft.

Another technical task of the present disclosure is to provide a motor assembly configured to have a structure in which a core assembly is fastened to an inner wall of a motor housing in a longitudinal direction of a shaft.

A further technical task of the present disclosure is to provide a motor assembly configured to have a structure in which a stator element is fastened to a side wall of a housing, whereby it is possible to secure an inner space of a motor assembly.

Technical Solutions

Various embodiments to solve the tasks of the present disclosure provide a motor assembly having a structure in which a core assembly is received in a seating recess formed in a motor housing in a longitudinal direction of a shaft.

An illustrative embodiment of the present disclosure provides a motor assembly having a structure in which a fixing portion formed at an insulator is inserted into and fixed to a fastening recess formed in a seating recess of a motor housing.

An illustrative embodiment of the present disclosure provides a motor assembly including a motor housing configured to receive a motor, a shaft configured to define an axis of rotation of the motor, a rotor coupled to the shaft, a plurality of cores provided along a circumference of the rotor, the plurality of cores being configured to form a magnetic path, a coil, and an insulator coupled to the core, the insulator being configured to insulate between the core and the coil, wherein the insulator includes an insulation portion configured to wrap an outer surface of the core and a fixing portion protruding from the insulation portion toward an outside of the rotor in a radial direction, and the fixing portion is coupled to an inner circumferential surface of the motor housing.

The motor housing may include a first coupling portion configured to form an outer circumference of the motor housing and a plurality of core supporting portions extending from the first coupling portion in a longitudinal direction of the shaft, the plurality of core supporting portions being configured to allow the insulator to be fixed thereto.

Each of the core supporting portions may include a seating recess formed in the longitudinal direction of the shaft, the seating recess being depressed toward the outside of the rotor in the radial direction, and a fastening recess formed so as to be depressed in an extension direction of the seating recess, the fastening recess being configured to allow the insulator to be fastened thereto, and the fixing portion may be received in the seating recess while being coupled to the fastening recess. In addition, the fixing portion may be coupled to the fastening recess in the longitudinal direction of the shaft.

When the fixing portion is coupled to the fastening recess, a depressed surface that forms the fastening recess may contact a protruding surface of the fixing portion, whereby the fixing portion may be engaged with the fastening recess, and the depressed surface may be provided in at least a part thereof with a bonding recess, the bonding recess being spaced apart from the protruding surface when the fixing portion is coupled to the fastening recess.

Meanwhile, the motor housing may include a first bearing housing configured to support one side of the shaft and a first bridge extending from each of the core supporting portions toward an inside of the shaft in a radial direction, the first bridge being configured to connect each of the core supporting portions and the first bearing housing to each other.

In addition, the motor assembly may further include a housing cover coupled to the motor housing, the housing cover including a second bearing housing configured to support the other side of the shaft, an impeller rotatably installed to the shaft, a diffuser coupled to the housing cover, the diffuser being provided between the impeller and the rotor, and a shroud configured to receive the impeller and the diffuser, the shroud being provided with a suction portion configured to allow external air to be introduced therethrough.

One side of each of the plurality of core supporting portions may abut the first coupling portion, and the other side of each of the plurality of core supporting portions may be connected to the first bearing housing via the first bridge. The first bridge may be provided with a first hole configured to define a flow channel configured to allow external air introduced through the suction portion to pass through the core therealong.

Meanwhile, the core may include two pole arms extending in a radial direction of the rotor and a connection portion configured to connect the two pole arms to each other, and the coil may be wound around each of the two pole arms. Alternatively, the coil may be wound around the connection portion.

The features of the above embodiments may be integrated into other embodiments unless the features are inconsistent or exclusive.

In addition, the present disclosure provides a motor assembly including a shaft configured to define an axis of rotation of a motor, a rotor coupled to the shaft, a core assembly comprising a plurality of cores provided along the circumference of the rotor, the plurality of cores being configured to form a magnetic path, a coil, and an insulator coupled to the core, the insulator being configured to insulate between the core and the coil, and a motor housing configured to receive the core assembly, wherein the insulator includes an insulation portion configured to wrap an outer surface of the core and a fixing portion protruding from the insulation portion toward an outside of the rotor in a radial direction, the motor housing includes a seating recess configured to receive the core assembly and a fastening recess configured to allow the fixing portion to be fixed thereto, and the seating recess and the fastening recess are formed in an inner surface of the motor housing.

The motor housing may include a core supporting portion configured to support the core assembly, and the seating recess and the fastening recess may be formed in the core supporting portion.

The fastening recess may be provided with a bonding recess, the bonding recess being configured to increase the force of coupling between the fixing portion and the fastening recess.

The fixing portion may protrude from opposite sides of the insulation portion toward the outside of the rotor in the radial direction so as to have an H shape, and the fastening recess may be configured to correspond in shape to the fixing portion.

In addition, the fixing portion may protrude from opposite sides of the insulation portion toward the outside of the rotor in the radial direction so as to have a Y shape, and the fastening recess may be configured to correspond in shape to the fixing portion.

In addition, the motor housing may include a first coupling portion configured to have a hollow ring shape, a core supporting portion extending from the first coupling portion in a longitudinal direction of the shaft, the core supporting portion being configured to support the core assembly, and a first bearing housing configured to support one side of the shaft, and the core supporting portion may be provided in plural.

Advantageous Effects

According to various embodiments of the present disclosure, a C-shaped stator core is fixed to a motor housing, whereby it is possible to increase fastening force of the stator core.

According to various embodiments of the present disclosure, the stator core is fixed to an inner surface of the motor housing, and opposite bearings of a shaft are received in the motor housing and a housing cover, whereby it is possible to secure an inner space of a motor assembly.

According to various embodiments of the present disclosure, an insulator, which is a basic component of a motor having low density, has a structure for fixing the stator core, whereby it is possible to simplify a coupling structure of the motor assembly and to reduce overall weight of the motor assembly.

According to various embodiments of the present disclosure, the stator core is fixed to an inner wall of the housing, and a rotor is located thereat, whereby it is possible to maintain a precise gap between the core and the rotor.

Effects of the present disclosure are not limited to the above mentioned effects, and other unmentioned effects can be clearly understood from the above description by those having ordinary skill in the technical field to which the present disclosure pertains.

BEST MODE FOR DISCLOSURE

Hereinafter, specific embodiments of the present disclosure will be described with reference to the accompanying drawings. The following detailed description is provided to assist in comprehensive understanding of a method, apparatus, and/or system described in this specification. However, this is merely an example, and the present disclosure is not limited thereto.

When describing the embodiments of the present disclosure, a detailed description of a known art related to the present disclosure will be omitted if it may make the subject matter of the present disclosure rather unclear. Terms used in the following description, which are defined taking into consideration functions realized in accordance with the present disclosure, may vary depending upon the intention of users or operators or upon usual practices. Therefore, the definition of such terms must be made based on the disclosure of this specification. The terms used in the present application are provided only to described specific embodiments, and do not limit the present invention. Singular forms are intended to include plural forms as well, unless the context clearly indicates otherwise. In the present disclosure, it should be understood that the terms "includes," "has," etc. specify the presence of stated features, numbers, steps, operations, elements, or parts or combinations thereof, but do not preclude the presence or addition of one or more other features, numbers, steps, operations, elements, or parts or combinations thereof.

Also, in describing components of an embodiment of the present disclosure, terms such as "first," "second," "A," "B," "(a)," and "(b)" may be used. These terms are used only for the purpose of distinguishing one constituent from another, and the terms do not limit the nature, order or sequence of the components.

Figure 1:
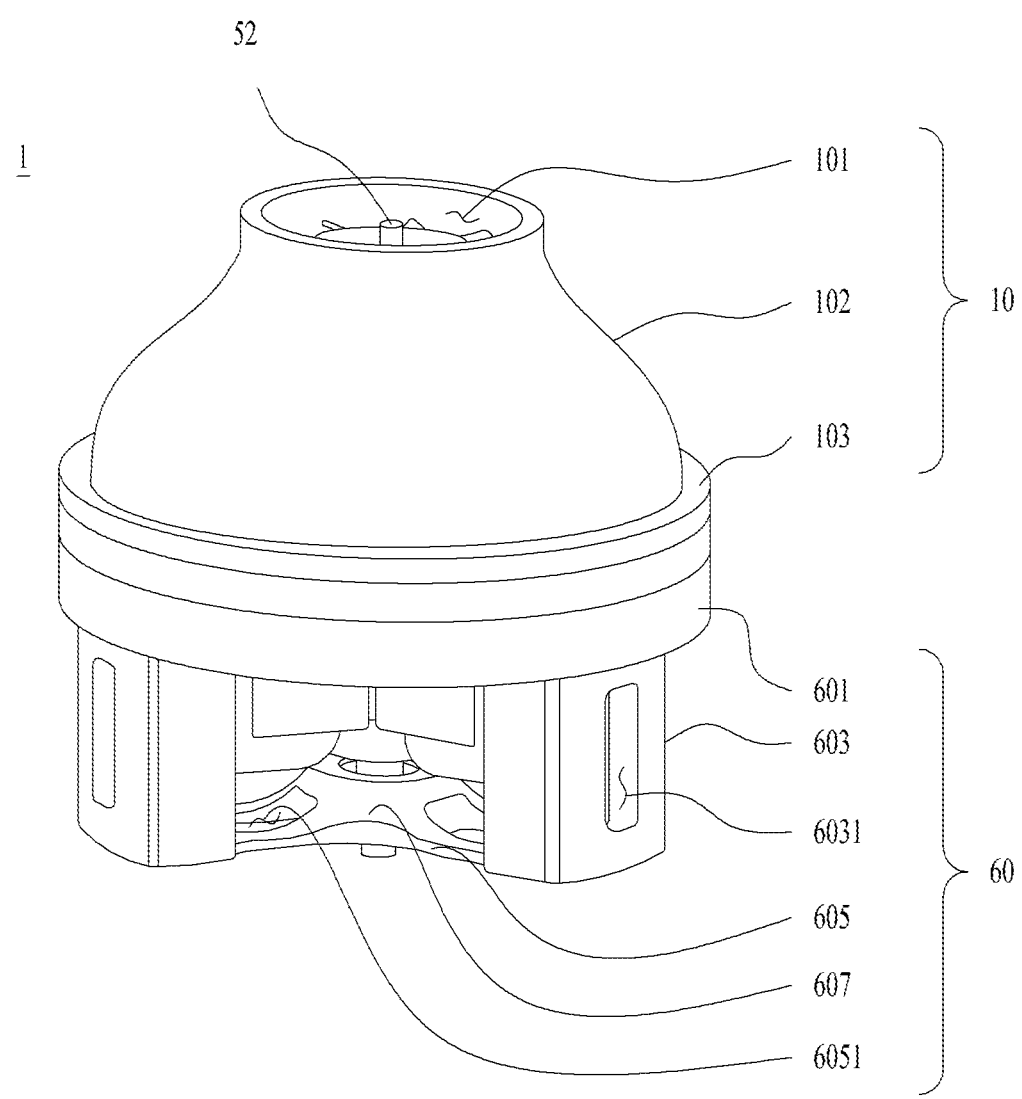
FIG. 1 is a perspective view of a motor assembly according to an embodiment of the present disclosure.
Figure 2:
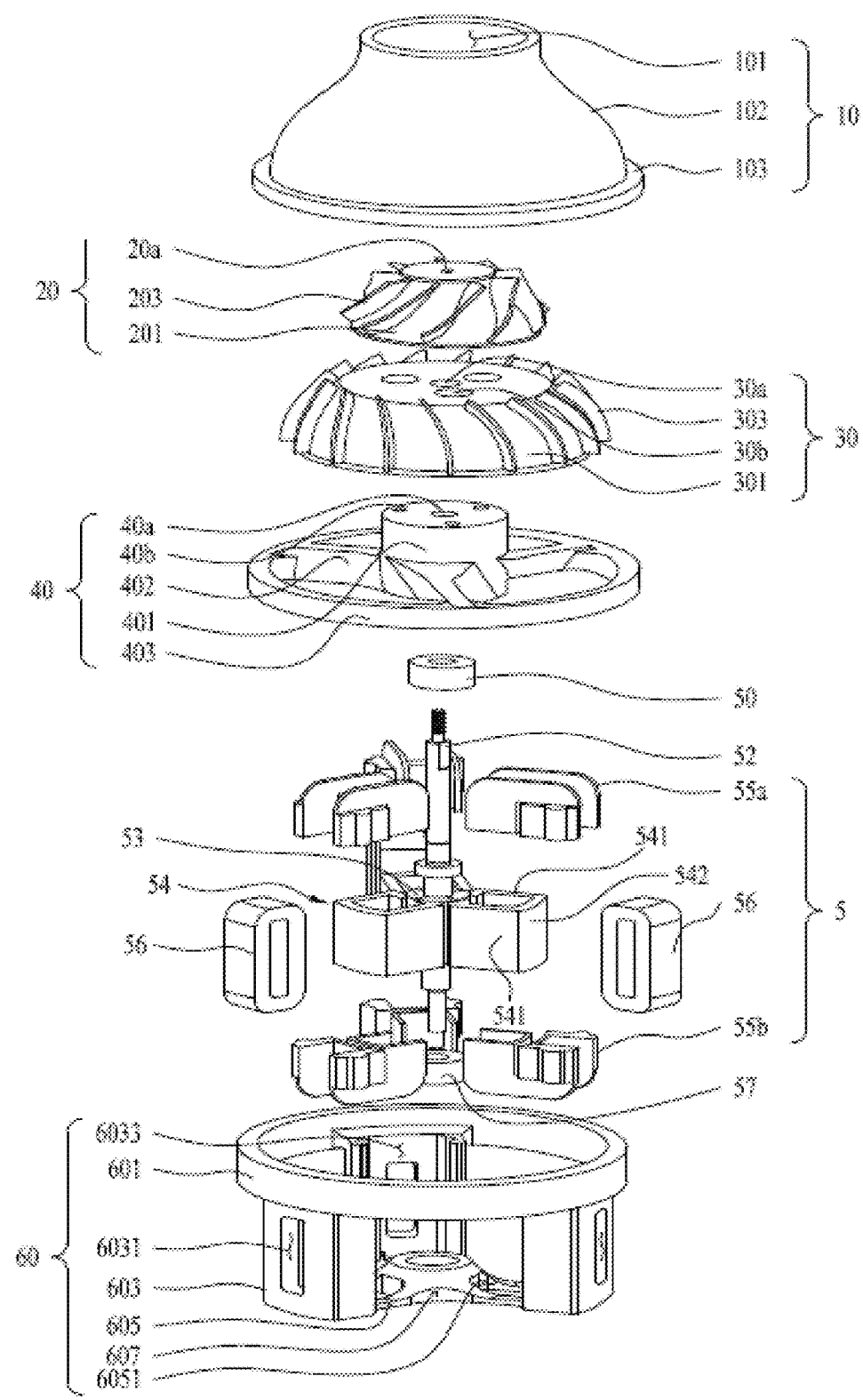
FIG. 2 is an exploded perspective view of the motor assembly according to the embodiment of the present disclosure.

FIG. 1 is a perspective view of a motor assembly according to an embodiment of the present disclosure, and FIG. 2 is an exploded perspective view of the motor assembly according to the embodiment of the present disclosure.

Hereinafter, description will now be given with reference to FIGS. 1 and 2.

The motor assembly 1 according to the embodiment of the present disclosure may be used in a small electric home appliance. As an example, the motor assembly may be used in a cleaner. There are a canister type cleaner, in which a nozzle configured to suction dust and a dust collector configured to store dust are connected to each other via a hose, and a handheld type cleaner, in which a nozzle and a dust collector are configured as a single module. For the handheld type cleaner, miniaturization and weight reduction of the cleaner are required, since a user performs cleaning in a state of holding the entirety of the cleaner module.

The motor assembly 1 may be applied to a small electric home appliance configured to satisfy the above-described requirements.

The motor assembly 1 of this embodiment may include a shroud 10, an impeller 20, a diffuser 30, a housing cover 40, a core assembly 5, and a motor housing 60.

The shroud 10 may suction and guide external air. In addition, the shroud may define the external appearance of an upper part of the motor assembly.

The shroud 10 may include a suction portion 101, a slope portion 102, and a third coupling portion 103. The suction portion 101 may be provided at an upper end of the shroud 10 so as to have a hollow ring shape. Since external air is introduced through the suction portion 101, the diameter of the suction portion 101 may be designed in consideration of the diameter of the impeller 20.

The shroud 10 may include a slope portion 102 extending from the suction portion 101 while forming a gentle curve. The slope portion 102 may be configured in a shape having a diameter gradually increasing from the suction portion 101 in an axial direction. The slope portion 102 may form a gentle curve in order to minimize a factor that may act as resistance to the flow of air introduced through the suction portion 101.

The suction portion 101 may be formed at one end of the slope portion 102, and the third coupling portion 103 may be formed at the other end of the slope portion 102. The third coupling portion 103 may extend outwards from the other end of the slope portion 102 in a radial direction so as to have a predetermined thickness. The third coupling portion 103 may contact one surface of a second coupling portion 403 of the housing cover 40, description of which will follow, to couple the shroud 10 and the housing cover 40 to each other. Of course, various structures for coupling between the third coupling portion 103 and the second coupling portion 403 may be applied within the thickness of the third coupling portion 103.

The impeller 20 may include a through-hole 20a, a blade 230, and an impeller body 201. The impeller 20 may be installed at one side of a shaft 52. More specifically, the impeller 20 may be installed opposite the other side of the shaft 52, at which a rotor 53 is installed, in an axial direction of the shaft 52.

The shaft 52, which defines the axis of rotation of a motor, is coupled to the through-hole 20a, whereby the impeller 20 may be fixed to one side of the shaft 52. The impeller 20 may be fixed to the shaft 52 using various methods. As an example, a screw fastening method may be used.

The impeller body 201 may be configured in a shape having a circumference gradually widened in the axial direction of the shaft 52. The blade 203 may extend outwards from an outer surface of the impeller body 201 in a radial direction of the shaft 52. The blade 203 may be provided in a longitudinal direction of the impeller body 201. Blades 203 may be disposed at the outer surface of the impeller body 201 so as to be spaced apart from each other in a circumferential direction.

The impeller 20 of this embodiment may be configured as a mixed-flow impeller, which suctions gas, such as air, in the axial direction of the shaft 52 and discharges the gas in an inclined direction between a centrifugal direction and the axial direction.

That is, gas introduced into the shroud 10 through the suction portion 101 may be guided to the motor housing 60 side along the outer surface of the impeller body 201 by rotation of the blade 203. However, embodiments of the present disclosure are not limited thereto, and the impeller 20 may be configured as a centrifugal impeller, which suctions gas in the axial direction and discharges the gas in the centrifugal direction. Hereinafter, however, a mixed-flow impeller will be described as the impeller 20 for convenience of description.

The diffuser 30 may include a through-hole 30a, a fastening hole 30b, a diffuser body 301, and a vane 303. The diffuser 30 may convert dynamic pressure of gas that passes through the impeller 20 into static pressure.

As the shaft 52 is inserted into the through-hole 30a, the diffuser 30 may be fastened to the shaft 52, and the diffuser 30 may be provided between the impeller 20 and the rotor 53. Consequently, the through-hole 30a may be provided at a position at which the through-hole 30a communicates with the through-hole 20a of the impeller 20 when the impeller 20 and the diffuser 30 are coupled to the shaft 52. The fastening hole 30b is a construction for coupling between the diffuser 30 and the housing cover 40.

The diffuser body 301 may be configured in a shape having a circumference gradually widened in the axial direction of the shaft 52. The vane 303 may extend outwards from an outer surface of the diffuser body 301 in the radial direction of the shaft 52. The vane 303 may be provided in a longitudinal direction of the diffuser body 301. Vanes 303 may be disposed at the outer surface of the diffuser body 301 so as to be spaced apart from each other in a circumferential direction.

In this structure, gas introduced into the shroud 10 through the suction portion 101 may be guided into a space between the shroud 10 and the diffuser 30 by the impeller 20, and the gas introduced between an inner surface of the shroud 10 and the diffuser may be guided to the core assembly 5 side by a plurality of vanes 303.

The housing cover 40 may include a through-hole 40a, a fastening hole 40b, a second bearing housing 401, a second bridge 402, and a second coupling portion 403.

The through-hole 40a, which is a construction into which the shaft 52 is inserted, may be formed at a position at which the through-hole 40a communicates with the through-hole 20a of the impeller and the through-hole 30a of the diffuser when the housing cover 40, the diffuser 30, and the impeller 20 are coupled to the shaft 52.

The fastening hole 40b, which is a construction for coupling between the diffuser 30 and the housing cover 40, may be formed at a position at which the fastening hole 40b communicates with the fastening hole 30b of the diffuser when the diffuser 30 is coupled to the housing cover 40.

It is preferable for the second bearing housing 401, which is a construction that receives a second bearing 50 configured to support one side of the shaft 52, to be provided at the center of the housing cover 40. As an example, the second bearing 50 may be a ball bearing, and a step depressed toward an inside of the shaft 52 in the radial direction may be formed at an outer surface of the shaft 52 in order to support the second bearing 50. Alternatively, of course, a step protruding toward an outside of the shaft 52 in the radial direction may be formed at the outer surface of the shaft 52 in order to support the second bearing 50.

The second coupling portion 403 extends outwards from the shaft 52 in the radial direction to form a predetermined thickness. One surface of the second coupling portion 403 may contact the third coupling portion 103 of the shroud 10 and the other surface of the second coupling portion 403 may contact the first coupling portion 601 of the motor housing 60 to couple the shroud 10, the housing cover 40, and the motor housing 60 to each other. Of course, various structures for the above-described coupling may be applied within the thickness of the second coupling portion 403.

The second bridge 402 connects the second bearing housing 401 and the second coupling portion 403 to each other. A plurality of second bridges 402 may be provided to improve structural stability of the housing cover 40, and the second bridge 402 may have a predetermined thickness to secure rigidity thereof.

When a plurality of second bridges 402 is provided while forming a predetermined thickness, the second bridges may act as resistance to the flow of external air introduced through the suction portion 101. Consequently, the second bridge 402 of this embodiment forms a predetermined slope in a longitudinal direction of the shaft 52. Since the second bridge 402 is inclined, it is possible to minimize a part that acts as resistance to the flow of external air introduced through the suction portion 101. In addition, the second bridge may guide the flow of external air to the core assembly 5 side to remove heat generated as the result of current flowing in a coil 56.

Meanwhile, the diffuser 30 may be integrally formed with the housing cover 40. Preferably, however, the diffuser may be manufactured separately from the housing cover 40 and may then be fastened to the housing cover 40.

The rotor 53 may be provided while wrapping a part of the outer surface of the shaft 52. The shaft 52 may be rotated by electromagnetic interaction between the rotor 53 and the core assembly 5, as the shaft 52 is rotated, the impeller 20 fastened to the shaft 52 may be rotated with the shaft 52, and as the impeller 20 is rotated, external air may be suctioned into the motor assembly 1.

The core assembly 5 may include a core 54, insulators 55a and 55b, and a coil 56. An example of the motor of this embodiment is a brushless direct current (BLDC) motor. Consequently, the core assembly 5 of this embodiment may be disposed outside the rotor 53.

The core 54 may be provided along the circumference of the rotor 53 to form a magnetic path, and a plurality of cores may be provided. The core 54 of this embodiment is an independent C-shaped core constituted by two pole arms spaced apart from each other and extending in the radial direction of the shaft 52 and a yoke that connects the two pole arms to each other.

The insulators 55a and 55b may be coupled to the core 54 to insulate between the core 54 and the coil 56 while wrapping the pole arms and the yoke of the core 54. A first insulator 55a and a second insulator 55b may be provided so as to be easily assembled to the core 54.

The motor housing 60 may include a first coupling portion 601, a core supporting portion 603, a first bridge 605, and a first bearing housing 607.

The first coupling portion 601, which is a construction for coupling with the second coupling portion 403 of the housing cover 40, as described above, may be configured in a hollow ring shape. The core assembly 5 may extend through the first coupling portion 601, and may be coupled to the motor housing 60 in the axial direction of the shaft 52.

The core supporting portion 603, which is a construction for supporting the core assembly 5, may extend from the first coupling portion 601 in the longitudinal direction of the shaft 52. A seating recess 6033 may be formed in the surface of the core supporting portion 603 that faces the shaft 52. The core assembly 5 may be received in the seating recess 6033.

A second hole 6031 may be formed in the core supporting portion 603. Heat generated as the result of current flowing in the coil 56 may be dissipated through the second hole 6031, or external air introduced through the suction portion 101 is discharged to the second hole 6031 via the core assembly 5, whereby the core assembly 5 may be cooled.

The first bearing housing 607 is a construction in which a first bearing 57 configured to support one side of the shaft 52 is received. Consequently, it is preferable for the first bearing housing 607 to be formed at the center of the motor housing 60. As an example, the first bearing 57 may be a ball bearing. The first bearing 57 and the second bearing 50 may support opposite sides of the shaft 52, whereby the shaft 52 may be stably rotated.

The first bridge 605 connects the first bearing housing 607 and the core supporting portion 603 to each other. A plurality of first bridges 605 may be provided to improve structural stability of the motor housing 60, and may have a predetermined thickness to secure rigidity of the second bridge 402.

A first hole 6051 may be formed in the first bridge 605. The first hole 6051 may be formed within the thickness of the first bridge 605. When a plurality of first bridges 605 is provided while forming a predetermined thickness, the first bridges may act as resistance to the flow of air that passes through the interior of the motor housing 60 in the longitudinal direction of the shaft 52. Consequently, the first hole 6051 is formed in the first bridge 605 of this embodiment in the longitudinal direction of the first bridge 605, whereby it is possible to minimize a portion that acts as resistance to the flow of air and to secure rigidity of the motor housing 60.

Figure 3:
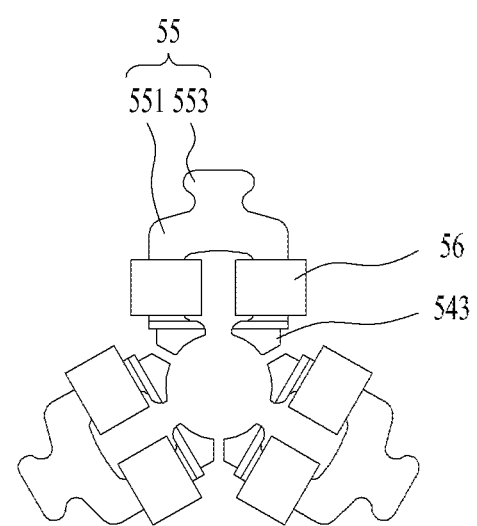
FIG. 3 is a view showing a core assembly according to an embodiment of the present disclosure.
Figure 3:
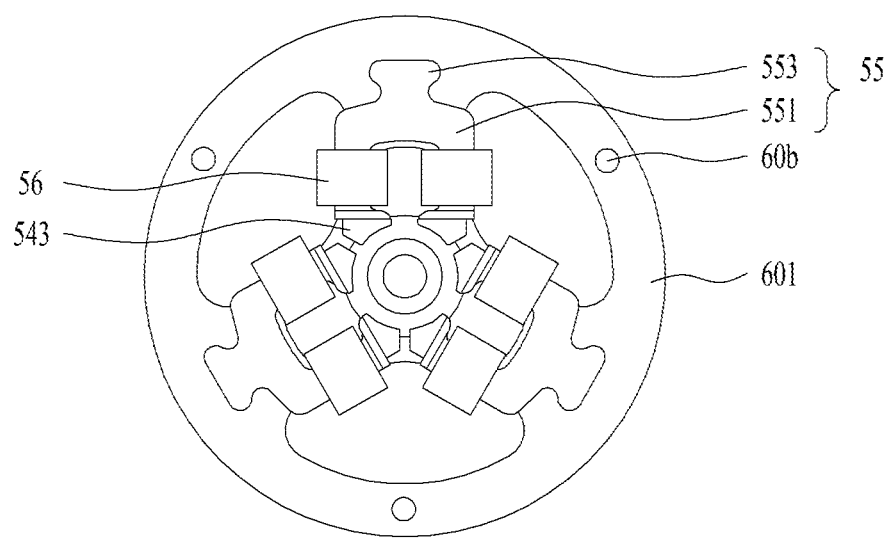
Figure 5:
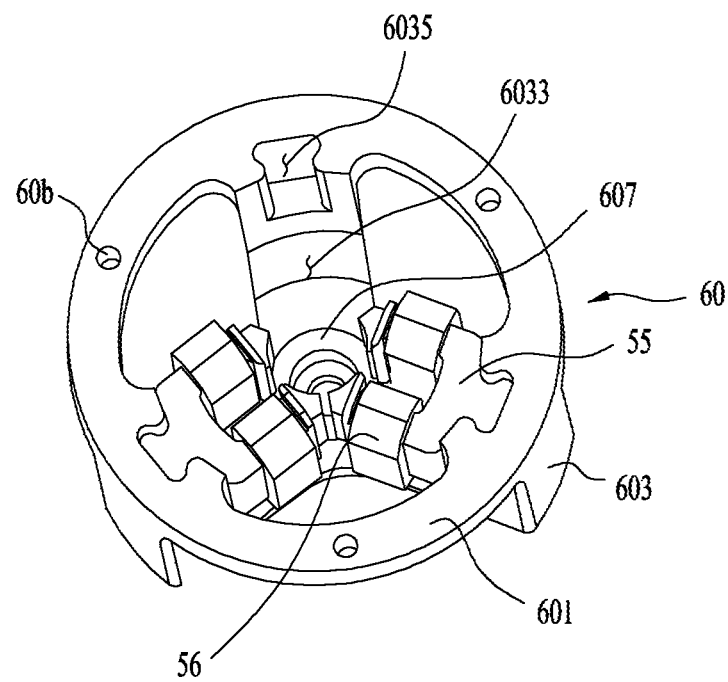
FIG. 5A is a view showing the core assembly of FIG. 3 and a motor housing.
FIG. 5B is a view showing the core assembly of FIG. 4 and a motor housing.
Figure 5:
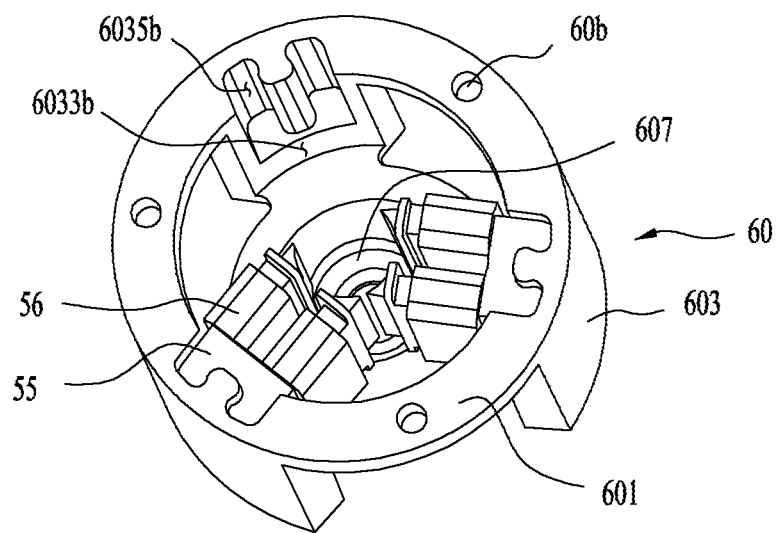

FIG. 3 is a view showing a core assembly according to an embodiment of the present disclosure, and FIG. 5A is a view showing the core assembly of FIG. 3 and the motor housing.

Hereinafter, description will now be given with reference to FIGS. 3 and 5A.

The core assembly 5 of this embodiment may include a core 54, an insulator 55, and a coil 56. The insulator 55 insulates between the core 54 and the coil 56 while wrapping a part of an outer circumferential surface of the core 54. More specifically, the insulator 55 may be provided while wrapping the remainder of the core 54 excluding a pole shoe 543.

Consequently, the insulator 55 wraps two pole arms 541 and a connection portion 542 that connects the two pole arms 541 to each other, and the pole shoe 543 is spaced apart from the rotor 53 by a predetermined distance and is provided while wrapping at least a part of an outer circumferential surface of the rotor 53.

The insulator 55 may include an insulation portion 551 configured to insulate between the core 54 and the coil 56 while wrapping the pole arms 541 and the connection portion 542 of the core 54, as described above.

In addition, the insulator 55 may include a fixing portion 553 protruding from the insulation portion 551 toward an outside of the rotor 53 in the radial direction. The outside of the rotor 43 in the radial direction means the same direction as the outside of the shaft 52 in the radial direction, since the rotor 43 is provided while wrapping a part of an outer circumferential surface of the shaft 52.

More specifically, the part of the insulator 55 that wraps the pole arms 541 of the core and the part of the insulator that warps the connection portion 542 that connects the pole arms to each other may be integrally formed, and the fixing portion 553 may extend from the part that wraps the connection portion of the core toward the outside of the rotor 53 in the radial direction.

Consequently, the insulation portion 551 of the insulator 55 wraps the pole arms 541 of the core 54 and the connection portion 542 that connects one side of one of the pole arm and one side of the other pole arm to each other, and the fixing portion 553 of the insulator 55 protrudes from the insulation portion 551 toward the outside of the rotor 53 in the radial direction, whereby the insulator 55 is generally configured in a Y shape.

The fixing portion 553 may be coupled to an inner circumferential surface of the motor housing 60. More specifically, the core assembly 5 may be received in a seating recess 6033, and the fixing portion 553 may be fixed to a fastening recess 6035.

The seating recess 6033 and the fastening recess 6035 are formed in an inner surface of the motor housing 60. More specifically, the motor housing 60 may include a first coupling portion 601 configured in a hollow ring shape to form an outer circumference of the motor housing 60 and a core supporting portion 603 extending from the first coupling portion 601 in the longitudinal direction of the shaft 52 to support the core assembly 5.

A plurality of fastening holes 60b is provided along the circumference of the first coupling portion 601, and the motor housing 60 and the housing cover 40 may be coupled to each other through the fastening holes 60b.

The seating recess 6033 and the fastening recess 6035 may be formed in the core supporting portion 603. The seating recess 6033 may be formed in the longitudinal direction of the shaft 52, and may be depressed toward the outside of the rotor 53 in the radial direction.

The seating recess 6033 is a portion in which the core assembly 5 is seated, and a step may be formed at a part of the seating recess 6033 to limit the depth of the core assembly 5 that is inserted in the longitudinal direction of the shaft 52. In addition, of course, the step may support the core assembly 5 in the axial direction.

The fastening recess 6035 is depressed in a direction in which the seating recess 6033 extends, and the insulator 55 is fastened to the fastening recess. That is, the fixing portion 553 may be fitted into the fastening recess 6035, whereby the insulator 55 may be fixed to an inner wall of the motor housing 60. In addition, the fixing portion 553 may be coupled to the fastening recess 6035 in the longitudinal direction of the shaft 52.

When the fixing portion 553 is coupled to the fastening recess 6035, a depressed surface that forms the fastening recess 6035 may contact a protruding surface of the fixing portion 553, whereby the fixing portion 553 may be engaged with the fastening recess 6035. That is, the fixing portion 553 may be fixed to the fastening recess 6035 while the fixing portion 553 and the fastening recess 6035 are in surface contact with each other.

The coil 56 may be wound around each of the two pole arms 541, or may be wound around the connection portion 542.

Figure 4:
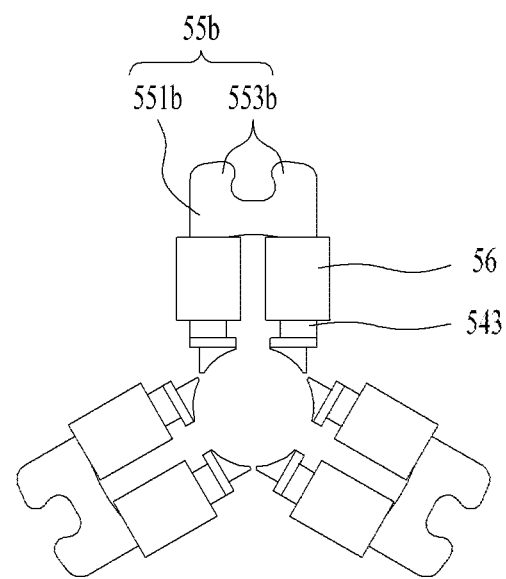
FIG. 4 is a view showing a core assembly according to another embodiment of the present disclosure.
Figure 4:
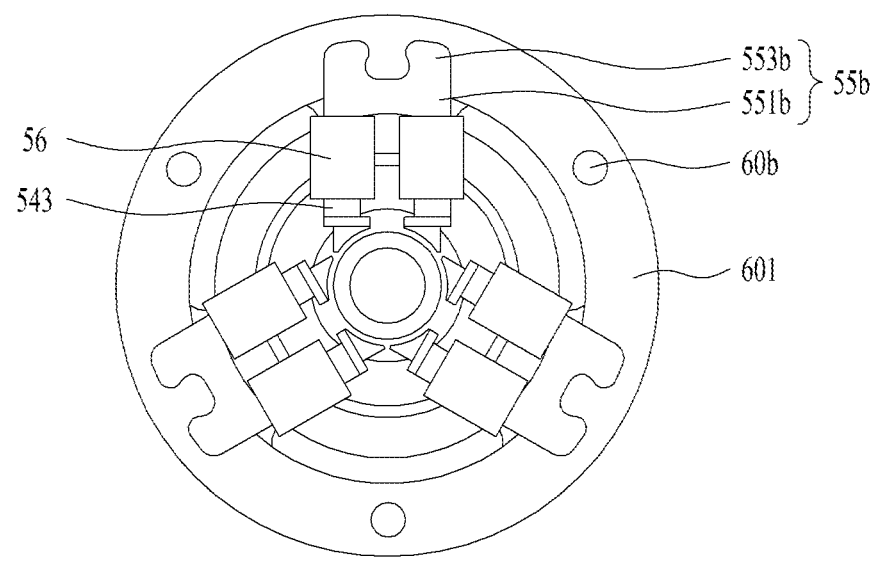

FIG. 4 is a view showing a core assembly according to another embodiment of the present disclosure, and FIG. 5B is a view showing the core assembly of FIG. 4 and the motor housing. The other embodiment of the present disclosure shown in FIGS. 4 and 5B is identical in structure to the embodiment of the present disclosure described with reference to FIG. 3 except that a structure in which the core assembly is fixed to the motor housing is changed, and therefore a duplicative description thereof will be omitted.

An insulator 55b of this embodiment includes an insulation portion 551b and a fixing portion 553b.

Since the core 54 includes two pole arms 541 and a connection portion 542 that connects the two pole arms to each other, whereby the core is configured in a C shape, the insulation portion 551b is provided while wrapping the pole arms 541 and the connection portion 542 so as to correspond in shape to the core 54.

The fixing portion 553b may protrude from opposite sides of the insulation portion 551b toward the outside of the rotor 53 in the radial direction. Consequently, the insulator 55b of this embodiment, which includes the fixing portion 553b and the insulation portion 551b, may be configured in an H shape.

A seating recess 6033b and a fastening recess 6035b may be formed in the core supporting portion 603 of the motor housing so as to correspond in shape to the insulator 55b.

As in this embodiment, the H-shaped insulator 55b has a structure capable of more easily withstanding lateral load than the Y-shaped insulator 55 shown in FIGS. 3 and 5A when inserted into the fastening recess 6035b.

In the insulator 55b of this embodiment, however, the fixing portion 553b has a larger area than in the Y-shaped insulator 55 shown in FIGS. 3 and 5A, and volumes of the seating recess 6033b and the fastening recess 6035b may be increased so as to correspond in shape to the fixing portion 553b.

When miniaturization and weight reduction are focused on according to requirements of a motor to be manufactured, therefore, the structure of the Y-shaped insulator may be more suitable than the structure of the H-shaped insulator. In order to improve durability and to increase coupling force, on the other hand, the structure of the H-shaped insulator may be more suitable than the structure of the Y-shaped insulator. Of course, these are relative and illustrative comparisons, and therefore the present disclosure is not limited to the above description.

Figure 6:
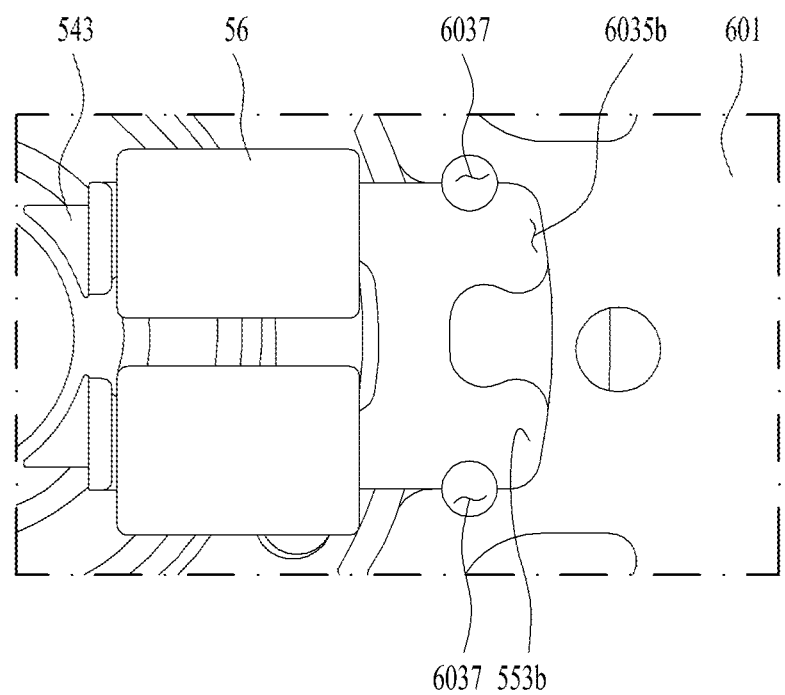
FIG. 6 is a view showing coupling between the core assembly of FIG. 4 and the motor housing.

FIG. 6 is a view showing coupling between the core assembly of FIG. 4 and the motor housing. Hereinafter, description will be given with reference to FIG. 6.

A bonding recess 6037 configured to increase the force of coupling between the fixing portion 553b and the fastening recess 6035b may be formed in the fastening recess 6035b of this embodiment. An adhesive material may be introduced through the bonding recess 6037 to more securely fix the insulator to the inner wall of the motor housing.

The bonding recess 6037 is formed in at least a part of a depressed surface of the fastening recess 6035b, and may be defined as a space spaced apart from the protruding surface of the fixing portion 553b when the fixing portion 553b is coupled to the fastening recess 6035b.

Of course, the bonding recess 6037 may also be applied to the Y-shaped insulator 55 described with reference to FIGS. 3 and 5A.

Although various embodiments of the present disclosure have been described in detail above, those skilled in the art will appreciate that the embodiments can be variously modified without departing from the category of the present disclosure. Therefore, the scope of rights of the present disclosure is not defined by the embodiments described above but is defined by the accompanying claims and equivalents thereto.

What is claimed is:

1. A motor assembly comprising:
 a motor housing that accommodates a motor;
 a shaft that defines an axis of rotation of the motor;
 a rotor coupled to the shaft;
 a core provided along a circumference of the rotor and configured to define a magnetic path;
 a coil; and
 an insulator coupled to the core and providing insulation between the core and the coil,
 wherein the motor housing comprises:
  a first coupling portion defining an outer circumference of the motor housing, and
  a core supporting portion extending from the first coupling portion in a longitudinal direction of the shaft,
 wherein the core supporting portion comprises:
  a seating recess defined in the longitudinal direction of the shaft and depressed toward an outside of the rotor in a radial direction, and
  a fastening recess depressed in an extension direction of the seating recess,
 wherein the insulator comprises:
  an insulation portion wrapping an outer surface of the core, and
  a fixing portion protruding from the insulation portion toward the outside of the rotor in the radial direction, the fixing portion being coupled to the fastening recess and being accommodated at the seating recess of the motor housing.

2. The motor assembly of claim 1, wherein the fixing portion is coupled to the fastening recess in the longitudinal direction of the shaft.

3. The motor assembly of claim 1, wherein, based on the fixing portion being coupled to the fastening recess, a depressed surface of the fastening recess contacts a protruding surface of the fixing portion to thereby engage the fixing portion with the fastening recess.

4. The motor assembly of claim 3, wherein the depressed surface of the fastening recess includes a bonding recess, the bonding recess being spaced apart from the protruding surface of the fixing portion based on the fixing portion being coupled to the fastening recess.

5. The motor assembly of claim 1, wherein the motor housing comprises:
 a first bearing housing supporting a first side of the shaft; and
 a first bridge extending from the core supporting portion toward an inside of the shaft in the radial direction, the first bridge connecting the core supporting portion to the first bearing housing.

6. The motor assembly of claim 5, further comprising:
 a housing cover coupled to the motor housing, the housing cover comprising a second bearing housing supporting a second side of the shaft.

7. The motor assembly of claim 6, further comprising:
 an impeller rotatably coupled to the shaft;
 a diffuser coupled to the housing cover and positioned between the impeller and the rotor; and
 a shroud receiving the impeller and the diffuser, the shroud including a suction portion configured to introduce external air.

8. The motor assembly of claim 7, wherein a first side of the core supporting portion abuts the first coupling portion, and
 wherein a second side of the core supporting portion is connected to the first bearing housing via the first bridge.

9. The motor assembly of claim 8, wherein the first bridge defines a first hole, the first hole defining a flow channel configured to allow external air introduced through the suction portion, wherein the external air passes through the core along the flow channel.

10. The motor assembly of claim 1, wherein the core comprises:
 pole arms extending in a radial direction of the rotor; and
 a connection portion connecting the pole arms to each other.

11. The motor assembly of claim 10, wherein the coil is wound around each of the pole arms.

12. The motor assembly of claim 10, wherein the coil is wound around the connection portion.

13. A motor assembly comprising:
a shaft that defines an axis of rotation of a motor;
a rotor coupled to the shaft;
a core assembly comprising:
a core provided along a circumference of the rotor and configured to define a magnetic path,
a coil, and
an insulator coupled to the core and providing insulation between the core and the coil; and
a motor housing accommodating the core assembly,
wherein the insulator comprises:
an insulation portion wrapping an outer surface of the core, and
a fixing portion protruding from the insulation portion toward an outside of the rotor in a radial direction, and
wherein the motor housing comprises:
 a first coupling portion having a hollow ring shape,
 a core supporting portion extending from the first coupling portion in a longitudinal direction of the shaft,
 a seating recess defined at the core supporting portion and configured to accommodate the core assembly, and
 a fastening recess defined at the core supporting portion and configured to fix the fixing portion, and
wherein the seating recess and the fastening recess are defined at an inner surface of the motor housing.

14. The motor assembly of claim 13, wherein the motor housing comprises a core supporting portion supporting the core assembly, and
   wherein the seating recess and the fastening recess are defined at the core supporting portion.

15. The motor assembly of claim 13, wherein the fastening recess includes a bonding recess, the bonding recess being configured to increase force of coupling between the fixing portion and the fastening recess.

16. The motor assembly of claim 13, wherein the fixing portion protrudes from opposite sides of the insulation portion toward the outside of the rotor in the radial direction, the fixing portion having an H shape, and
   wherein the fastening recess corresponds in shape to the fixing portion.

17. The motor assembly of claim 13, wherein the fixing portion protrudes from opposite sides of the insulation portion toward the outside of the rotor in the radial direction, the fixing portion having a Y shape, and
   wherein the fastening recess corresponds in shape to the fixing portion.

18. The motor assembly of claim 13, wherein the motor housing comprises:
   a first bearing housing supporting a side of the shaft,
   wherein the core supporting portion is provided in plural.

* * * * *